United States Patent [19]
Torghele

[11] 3,972,223
[45] Aug. 3, 1976

[54] FLOATING PLANT FOR CHARGING AND DISCHARGING MINERAL OIL PRODUCTS AND THE LIKE

[75] Inventor: Flavio Torghele, Milan, Italy

[73] Assignee: Treg S.p.A., Veniceano, Italy

[22] Filed: June 13, 1974

[21] Appl. No.: 479,100

[30] Foreign Application Priority Data
June 13, 1973 Italy .................................. 25296/73

[52] U.S. Cl. ................................ 73/12; 73/40.5 R; 73/49.1; 116/70; 138/104
[51] Int. Cl.² ........................................... G01M 3/28
[58] Field of Search ............ 116/70, 114 P, 114 PV; 73/49.5; 138/104, 133; 9/8 P

[56] References Cited
UNITED STATES PATENTS

| | | | |
|---|---|---|---|
| 3,211,127 | 10/1965 | Boelhouwer | 116/70 |
| 3,299,417 | 1/1967 | Sibthorpe | 73/49.1 X |
| 3,465,374 | 9/1969 | Johnson et al. | 9/8 P |
| 3,543,805 | 12/1970 | Matthews | 138/133 |
| 3,581,775 | 6/1971 | Dahl | 138/104 |
| 3,721,270 | 3/1973 | Wiggenstein | 73/49.1 X |
| 3,802,456 | 4/1974 | Wittgenstein | 138/104 |

Primary Examiner—Jerry W. Myracle
Assistant Examiner—Joseph W. Roskos
Attorney, Agent, or Firm—Stevens, Davis, Miller & Mosher

[57] ABSTRACT

The immersed hoses of a floating plant for charging and discharging mineral oil products comprise means for the immediate indication of impacts, partial damages and rupture of the hoses themselves. Said means consist of a hollow space provided in the wall of the hoses, filled with a fluid under pressure and connected to means for monitoring its variations.

Impacts, partial damages and ruptures, originating a variation in the pressure of the fluid inside the hollow space, can be detected immediately.

8 Claims, 3 Drawing Figures

FLOATING PLANT FOR CHARGING AND DISCHARGING MINERAL OIL PRODUCTS AND THE LIKE

The present invention concerns a floating plant for charging and discharging mineral oil products.

More particularly, it refers to the immersed part of the plant, namely the part providing a connection between the floating platform or buoy and the rigid pipes laid on the bottom of the water stretch, consituting the terminal of an oil pipeline.

Floating plants for charging and discharging mineral oil products from oil-tankers are already known. Said plants comprise a floating buoy or platform anchored to the bottom of the water stretch. Rigid pipes constituting the terminal of an oil pipeline are laid on the bottom of the water stretch.

Large-diameter flexible hoses connect the ends of the rigid pipes to the floating buoy or platform.

Floating hoses, starting from the buoy, are connected to the oil-tankers.

The means for mooring the oil-tankers during the charging and discharging operations are mounted on the buoy.

The flexible hoses of conventional type which connect the floating buoy or platform with the terminal of the oil pipeline are generally constituted by a plurality of portions of flexible hoses provided with end flanges for their mutual connection intended to form the piping.

More particularly, the portions of flexible hose are portions of a hose of elastomeric material containing a reinforcing structure used to enable the hose portions to withstand above all flexion stresses and inner and outer pressures.

In fact, as the floating buoy or platform is anchored to the bottom of the water stretch, it cannot suffer such displacements as to subject the flexible hose to tension; however, since said floating buoy or platform follows the wave motion, the flexible hose is subjected to flexion stresses and to fatigue flexion stresses.

Said flexion stresses and above all the fatigue flexion stresses can in course of time originate ruptures in the flexible hose connecting the terminal of the oil pipeline with the floating buoy or platform. Also impacts from submersed bodies against the flexible hose can cause its rupture.

Said ruptures, obviously, involve the outflow of mineral oil products, with two evident consequences, namely leak of mineral oil and pollution.

Very often, owing to the presence of submarine streams in the water stretch where the plant is situated, the mineral oil outflowing from the impaired flexible hose not always comes to the water surface in proximity of the floating buoy or platform, indicating with its presence the irregular condition of the plant, but can reach the water level several hundreds of meters far from the buoy, namely in a not visible position. Consequently, the indication of the rupture of the hose can be noticed only after some time, and therefore when the damages caused by said rupture are already relevant.

The present invention aims at providing a plant comprising means for the immediate indication of any dangerous stress and/or of failures even partial of the flexible hose connecting the terminal of an oil pipeline with the floating buoy or platform.

A further aim of the present invention is a plant in which it is possible to have an immediate indication of impacts against the flexible hose connecting the terminal of an oil pipeline with the floating buoy or platform.

A further aim of the invention is a plant in which it is possible to have an indication able to monitor whether the rupture of the flexible hose connecting the terminal of an oil pipeline with the floating buoy or platform has taken place owing to fatigue stresses or for accidental external causes.

A still further aim of the invention is a plant in which it is possible to locate immediately in which position of the piping impacts haave occurred or where a failure has happened, in order to act immediately on the damaged or impaired part.

Accordingly, the object of the present invention is a floating plant for charging and discharging mineral oil products, of the type comprising a floating buoy or platform and at least a flexible hose for connecting the fixed pipe laid on the bottom of the water stretch to said buoy or platform, wherein said hose contains in its wall means able to indicate at least local variations of the pressure on the outer surface and of the pressure on the inner surface of said hose with respect to a pre-established pressure value.

The present invention will be better understood from the following detailed description, given by way of non-limiting example and made with reference to the figures of the attached sheets of drawings, in which:

FIG. 1 represents partially the part of a plant for charging and/or discharging mineral oil products, which extends from the floating buoy or platform to the terminal of an oil pipeline laid on the bottom of a water stretch.

Figure 1:
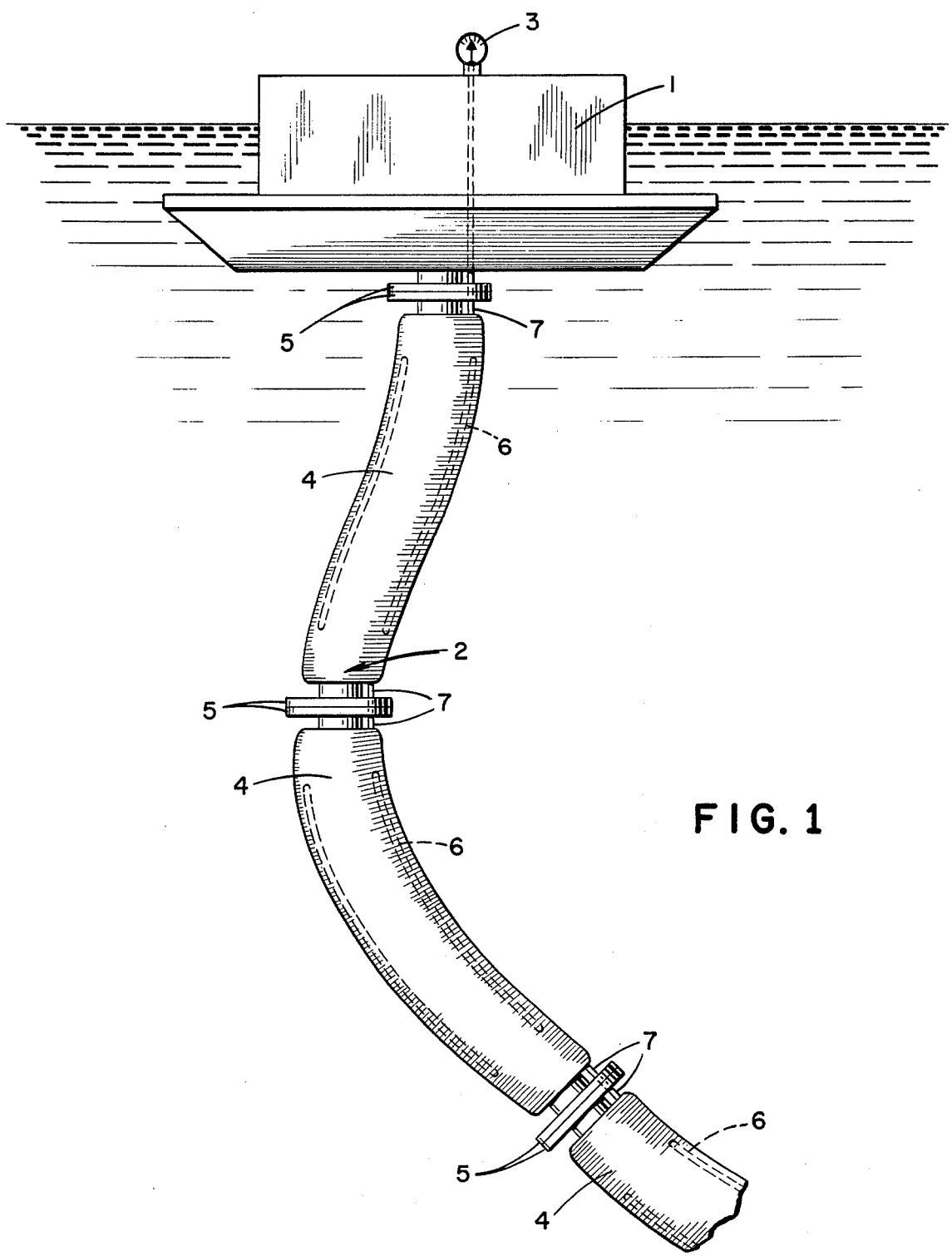
FIG. 1 represents the part of the plant comprising the floating buoy or platform and a portion of the flexible hose connecting said buoy or platform and the terminal of an oil pipeline laid on the bottom of a water stretch.

As shown in FIG. 1, 1 indicates the floating buoy or platform and 2 is the flexible hose connecting the buoy with the terminal of the oil pipeline (not represented) laid on the bottom of the water stretch.

The floating buoy or platform 1, having the task of maintaining at the water surface one end of the flexible hose 2, comprises bitts (not represented) to secure said floating buoy or platform to the oil-tankers during said charging and/or discharging operation.

The floating buoy or platform 1 comprises also the means referred to with 3, explained below, which indicate the impacts received from the hose 2 and/or the ruptures of the latter.

As represented in FIG. 1, the hose 2 is constituted by a plurality of hose portions 4, provided at their ends with flanges 5, by means of which said hose portions are mutually connected to originate the hose 2.

Also the buoy or platform 1 is provided, in its immersed portion, with a flange 5 for its connection with the hose 2.

The various hose portions are flexible and contain in their wall means, sensitive to impacts or even partial ruptures of the hose wall, which issue a signal when one of these events takes place.

In general, it can be therefore said that the various hose portions contain means able to indicate variations of the pressure on the inner surface and/or on the outer surface of the hose, originated in any way, with respect to a pre-established pressure value.

More particularly, the flexible hose portions 4 are made of an elastomeric or plastic material and the wall of said hose portions contains a resistant structure, incorporated therein.

As to the means sensitive to impacts and to ruptures of the wall of the hose portions 4, those constituted by a hollow space 6 (FIG. 1), filled with fluid under pressure, are particularly convenient.

When the means sensitive to impacts and/or ruptures of the hose portions 4 consist of a hollow space 6 containing a fluid under pressure (for instance water), the monitoring means 3 (FIG. 1) is a pressure gauge or a similar device.

The various hollow spaces 6 of the tubular portions are then connected together by means of small tubes 7.

In an alternative embodiment, not represented, the hollow spaces 6 are not connected together, but each of them is connected with an individual means 3 (for instance a pressure gauge) carried by the floating buoy or platform.

In this way it is also possible to locate in which position of the hose 2 the failure or the impact has taken place.

The essential feature of the hollow space 6 filled with fluid under pressure is that it must not practically change of volume, namely must be practically at constant capacity also when the hose portions 4 are inflected.

The expressions "practically constant volume" and "practically constant capacity" mean that said volume and capacity may vary in a small range of values. In particular, for convenience, the range of said values will preferably be of an entity smaller than the sensitivity of the monitoring means (pressure gauge).

Figure 2:
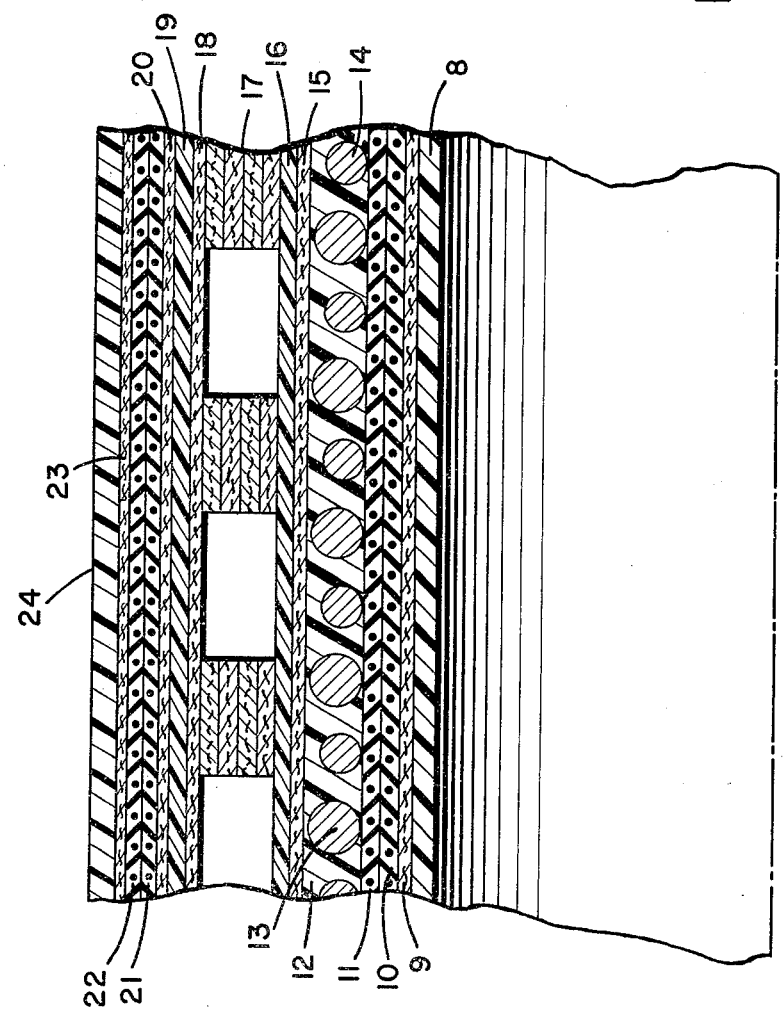
FIG. 2 represents in section a portion of the flexible hose.

In order to have a hollow space 6 with a practically constant volume characteristics and therefore with the desired practically constant capacity, it is particularly convenient for the tubular portions 4 to have the following structure, clearly represented in FIG. 2.

As visible in said figure, from the inside to the outside the following elements are found:
— a tubular layer 8 of a compound of an elastomeric or plastic material of such a recipe as to resist to the chemical action of the conveyed fluid, which is in particular a mineral oil product. Compounds of elastomeric or plastic materials of this type are known to the technicians of this field and are available in large number —
— at least a tubular layer 9 of square woven fabric, impregnated with elastomeric or plastic material —
— at least two superimposed layers 10 and 11 of rubberized or plastics-coated cord fabric in the form of two windings of rubberized cord tape arranged the one clockwise and the other counterclockwise —
— a tubular layer 12 of elastomeric or plastic material embedding at least a helicoid of metal rod. In the particular case represented in FIG. 2, the tubular layer 12 of elastomeric or plastic material contains, embedded into it, two helicoids 13 and 14 of metal rod. In particular, the helicoid 13 is a mmetal rod of a diameter greater than that forming the helicoid 14 —
— at least a tubular layer 15 of square woven fabric impregnated with elastomeric or plastic material —
— a tubular layer 16 of a compound of elastomeric or plastic material —
— rigid elements 17 cantilevered from the outermost surface of the tubular layer 16. Said rigid elements 17 can have a different configuration, since their task is merely that of creating rigid bridges between layer 16 and layer 18 which is arranged in outermost position and is described below, in such a way as to allow a continuity in the hollow space formed by virtue of their presence between said layers 16 and 18. In particular, the rigid elements 17 can take the shape of a continuous helicoid positioned on the layer 16 or can be blocks cantilevered on the surface of said layer 16. For obtaining said rigid elements, it is particularly convenient to use lengths of rubberized or plastics-coated square woven fabric doubled together —
— at least a tubular layer 18 of square woven fabric impregnated with elastomeric or plastic material —
— at least a tubular layer 19 of a compound of elastomeric or plastic material —
— at least a tubular layer 20 of square woven fabric impregnated with elastomeric or plastic material —
— at least two superimposed layers 21 and 22 of rubberized or plastics-coated cord fabric in the form of two windings of rubberized or plastics-coated cord tape arranged the one clockwise and the other counterclockwise —
— at least a tubular layer 23 of square woven fabric impregnated with elastomeric or plastic material —
— a tubular covering layer 24 of elastomeric or plastic material having such a recipe as to resist to the action of the means in which the flexible hose is immersed, said type of material being known per se to the technicians of this field.

As said above, the hollow spaces 6 of the various tubular portions 4 are connected together or the hollow spaces 6 of each tubular portion 4 are connected to a monitoring device, for instance a pressure gauge, positioned on the floating buoy or platform.

It is therefore necessary to provide at least a duct for placing into communication hollow space of each hose portion with the monitoring device situated outside the hose portion.

Figure 3:
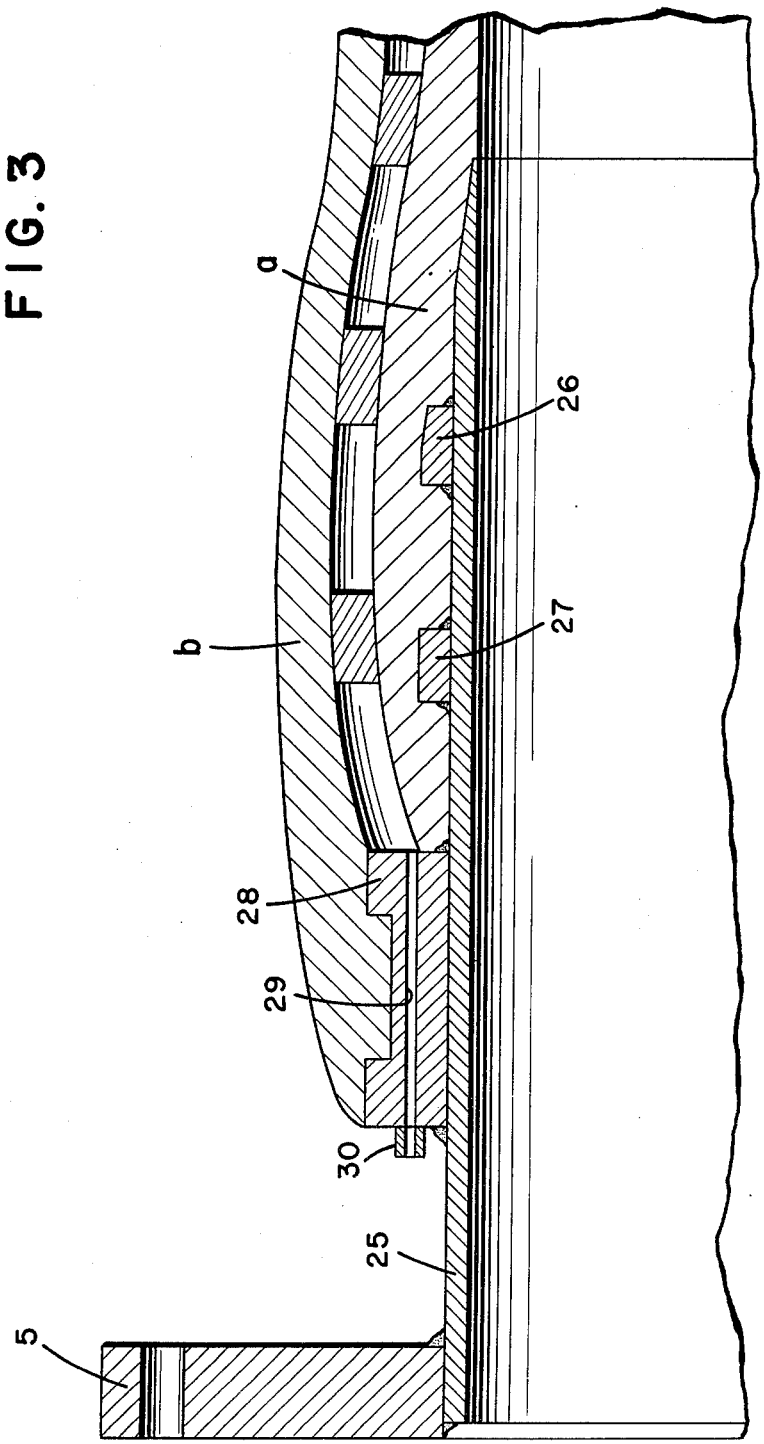
FIG. 3 represents in section a portion of the flexible hose at one of its flanges.

A particularly useful way for obtaining the duct placing into communication the hollow space with the outside is represented in FIG. 3.

FIG. 3 represents in longitudinal section the end of a tubular portion 4.

As visible in said FIG. 3, the flange 5 (see also FIG. 1) is provided with a tang 25 of metallic material, on which are fixed the rings 26, 27 and 28.

The assembly of layers 8, 9, 10, 11, 12, 15 and 16, indicated in the FIG. with the reference letter a, is secured with ties not represented to the rings 26 and 27, whilst the assembly of layers 18 to 24, indicated in the FIG. with the reference letter b, is secured to the ring 28 by means of ties not represented.

Moreover, the ring 28 is provided with a through hole 29 which opens in the hollow space existing between the two above described assemblies of layers.

Outside the ring 28, at the through hole 29, is fixed a nozzle 30 for connecting the hollow space of the hose portion 4 with those of the other hose portions or for connecting said hollow spaces with individual monitoring devices carried by the floating buoy or platform.

The operation of the above described plant is the following.

The mineral oil coming from the terminal of the oil pipeline or going towards it, passes in the hose 2, wherein there is a certain pressure, for instance 15 atm.

The hollow spaces 6 contain instead a stagnant fluid under a pressure for instance of 2 atm, and the value of said pressure appears on the dial of the pressure gauge 3.

A certain hydrostatic pressure of the water wherein the hose is immersed exists outside the hose 2.

When a hose portion 4 suffers a damage or an impact of a certain entity, a variation of the pressure takes place inside the hollow space 6 and said variation is indicated by the pressure gauge 3.

More particularly, if an internal failure occurs in a hose portion 4, namely a failure in the assembly of layers $a$ existing between the hollow space 6 and the inside of the hose portion 4, a pressure increase takes place in said hollow space 6. The same happens if the failure concerns the whole thickness of the hose portion 4.

Instead, if an external failure takes place in a hose portion, namely a failure in the assembly of layers $b$ existing between the hollow space 6 and the outer surface of the hose, a drop of pressure is noticed in said hollow space 6, and it is indicated by the pressure gauge 3.

If a hose portion 4 suffers an impact, without however any prejudice to the assembly of layers $b$, a pressure increase takes place in the hollow space 6, which is indicated by the pressure gauge 3; in fact, in this case, the hollow space 6 reduces its volume, and said reduction of volume involves necessarily an increase of pressure.

From the above description it can be easily understood that, with the plant according to the present invention, it is possible to achieve the above mentioned desired aims, and also that, having reached said aims, it is possible to prevent pollution and leaks of mineral oil products for the following reasons.

It is noticed that a damage can take place owing to the indication of impacts of the flexible hose against immersed bodies, so that there is the possibility of removing said bodies or of moving away from them the flexible hose by displacing the floating buoy or platform.

It is noticed that the flexible hose is partially damaged and therefore it is possible to replace the damaged portion.

Although some preferred embodiments of the present invention have been described and illustrated, it is understood that it includes any other possible alternative embodiment deriving from the above exposed inventive concept.

In particular, it includes the alternative embodiment in which the flexible hose 2 is made of a single piece and has the structure described and illustrated for the hose portions 4.

What is claimed is:

1. A floating plant for charging and discharging mineral oil having a floating platform, a visible pressure gauge and a flexible hose for connecting the platform to a pipe fixed on the bottom of a body of water, said flexible hose comprising a tube for conveying oil and a protective jacket about the tube, said jacket comprising internal rigid members spaced from each other to provide circumferentially spaced open spaces which extend longitudinally through the hose and are of substantially constant volume, said spaces being filled with a liquid under pressure, and means for connecting the open spaces to the pressure gauge whereby impacts on the jacket cause a variation in the pressure of the said liquid which is indicated on the pressure gauge.

2. A plant as in claim 1, wherein the jacket of the flexible hose has a composite structure comprising, from the inside to the outside, a first tubular layer of elastomeric or plastic material of such a composition as to resist to the chemical action of the conveyed material, a second tubular layer of square woven fabric, at least two superimposed windings of rubberized or plastics-coated cord fabric arranged the one clockwise and the other counterclockwise, a third tubular layer of elastomeric or plastic material embedding at least a helicoid of metal rod, a fourth layer of square woven fabric, a fifth tubular layer of elastomeric or plastic material, rigid elements cantilevered from the said fifth tubular layer, a sixth tubular layer of square woven fabric over said rigid elements, a seventh tubular layer of elastomeric or plastic material, an eighth tubular layer of square woven fabric, at least two superimposed windings of rubberized or plastics-coated cord fabric wound up the one clockwise and the other counterclockwise over the said eighth tubular layer, a tubular layer of square woven fabric over the outer of said superimposed windings, and a covering layer of elastomeric or plastic material.

3. A plant as in claim 2, wherein the said rigid elements are helically applied on the said fifth tubular layer.

4. A plant as in claim 3, wherein the rigid protuberance is constituted by a plurality of tapes of rubberized fabric doubled together.

5. A plant as in claim 2, wherein the rigid elements are rigid blocks applied on the said fifth tubular layer.

6. A plant as in claim 5, wherein the rigid blocks are constituted by a plurality of portions of rubberized fabric doubled together.

7. The plant of claim 1 wherein said flexible hose comprises a plurality of segments and means for connecting adjacent segments together which comprises a tubular member inserted in an end of one of said segments with one end of the tubular member exposed, an annular flange about the exposed end of the tubular member which adapts the tubular member for attachment to a flange of a similar tubular member of an adjacent segment, a rigid annular member secured about the tubular member having a bore extending longitudinally therethrough that portion of said jacket of the segment which is disposed radially outwardly from said spaces being secured on said ring and that portion of the jacket disposed radially inwardly of the said spaces being disposed against an end of the ring with said spaces communicating with the bore through the ring, and a tubular member adapted to connect said bore of one ring with the bore of a ring of the tubular member of an adjacent segment.

8. In an apparatus for conveying an oil between a floating platform and a pipe submerged below the surface of a body of water, said platform having a flanged fitting for connecting it to a conduit, a flexible hose having a core tube through which said oil can flow and a reinforcing jacket therearound, said jacket comprising a first thickness of a plurality of layers comprising fabric lying one on the other and disposed about the core tube and a second thickness of a plurality of layers comprising fabric lying one on the other and disposed about the first thickness, a layer of rigid spacer elements disposed between the said thicknesses providing hollow spaces therebetween, said spaces being filled with a liquid, a pressure responsive gauge on the platform, means for connecting the said spaces to the gauge whereby said gauge will respond to changes in pressure in the said spaces caused by impacts on the hose or rupture of the hose, a tubular member disposed in one end of said hose and secured thereto, said tubular member having one end exposed beyond the said end of the hose and an annular flange on the fitting adapted to be connected to the flange of said fitting on the platform.

* * * * *

UNITED STATES PATENT AND TRADEMARK OFFICE
CERTIFICATE OF CORRECTION

PATENT NO. : 3,972,223
DATED : August 3, 1976
INVENTOR(S) : Flavio Torghele

It is certified that error appears in the above-identified patent and that said Letters Patent are hereby corrected as shown below:

Item [73] change Veniceano to ---Veniano---

Column 2, Line 13 change haave to ---have---

Column 3, Line 64 change mmetal to ---metal---

Column 4, Line 42 after "communication" insert ---the---

Claim 2, Column 6, Line 15 after "fourth" insert ---tubular---

Signed and Sealed this

Ninth Day of November 1976

[SEAL]

Attest:

RUTH C. MASON
*Attesting Officer*

C. MARSHALL DANN
*Commissioner of Patents and Trademarks*